C. KIRINO.
METHOD AND MACHINE FOR PEELING TOMATOES.
APPLICATION FILED NOV. 8, 1918.

1,312,332.

Patented Aug. 5, 1919.
7 SHEETS—SHEET 1.

WITNESSES

INVENTOR
CHARLES KIRINO
BY
ATTORNEYS

C. KIRINO.
METHOD AND MACHINE FOR PEELING TOMATOES.
APPLICATION FILED NOV. 8, 1918.

1,312,332.

Patented Aug. 5, 1919.

WITNESSES

INVENTOR
CHARLES KIRINO
BY
ATTORNEYS

C. KIRINO.
METHOD AND MACHINE FOR PEELING TOMATOES.
APPLICATION FILED NOV. 8, 1918.

1,312,332.

Patented Aug. 5, 1919.
7 SHEETS—SHEET 6.

WITNESSES

INVENTOR
CHARLES KIRINO
BY
ATTORNEYS

C. KIRINO.
METHOD AND MACHINE FOR PEELING TOMATOES.
APPLICATION FILED NOV. 8, 1918.

1,312,332.

Patented Aug. 5, 1919.
7 SHEETS—SHEET 7.

WITNESSES

INVENTOR
CHARLES KIRINO
BY
ATTORNEYS

UNITED STATES PATENT OFFICE.

CHARLES KIRINO, OF OGDEN, UTAH.

METHOD AND MACHINE FOR PEELING TOMATOES.

1,312,332. Specification of Letters Patent. Patented Aug. 5, 1919.

Application filed November 8, 1918. Serial No. 261,605.

*To all whom it may concern:*

Be it known that I, CHARLES KIRINO, a subject of the Emperor of Japan, and a resident of Ogden, in the county of Weber and State of Utah, have invented a new and Improved Method and Machine for Peeling Tomatoes, of which the following is a description.

My invention relates to a method of peeling tomatoes or other vegetables or fruits of similar form and having a skin of a nature to be readily loosened by scalding, the method being characterized by the step of dividing the skin of each tomato into sections while on the fruit and by the subsequent steps of scalding the tomato and the removal of the skin sections.

The invention relates also to means for carrying out in the preferred manner the indicated steps of the process and for conveying the tomatoes to the points where the steps of the process are to be performed as well as for performing other operations including the preliminary washing of the tomatoes, the cooling of the same after the step of scalding, the topping of the tomatoes, and the coring of the same, together with other detail operations as will appear from the specific description following.

Reference is to be had to the accompanying drawings forming a part of this specification, it being understood that the drawings are merely illustrative of one example of the invention.

Figure 1:
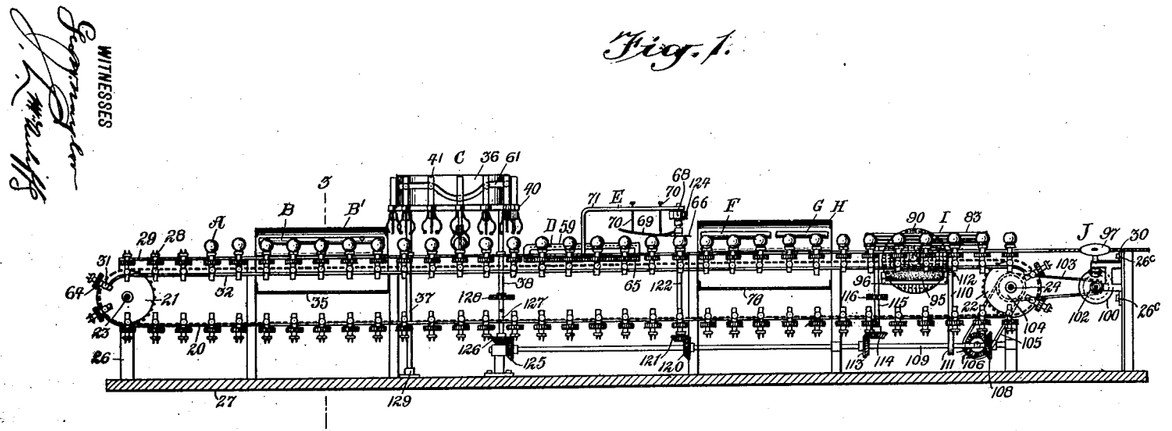
Figure 1 is a longitudinal vertical section of a machine constructed in accordance with my invention, the section being taken on the line 1—1, Fig. 2.
Figure 2:
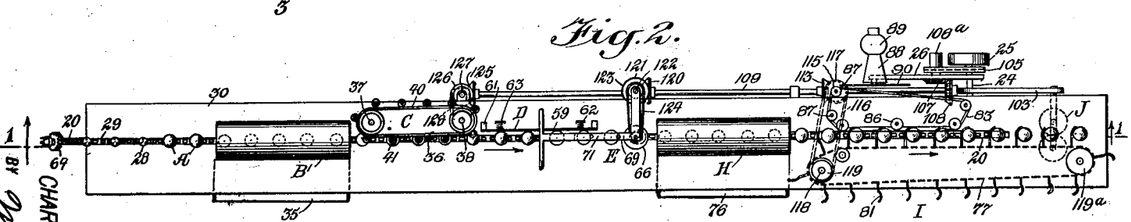
Fig. 2 is a plan view of the machine.

In the illustrated machine for carrying out my invention, an endless belt 20 is provided, the working and return runs of which travel in the same vertical plane longitudinally of the machine, said belt traveling over rollers 21, 22 on horizontal shafts 23, 24, the latter being indicated as a drive shaft to be actuated in any suitable manner, there being indicated a pulley 25 for receiving a belt from any convenient source of power (not shown). The shafts turn in framework designated generally by the numeral 26 on a base 27. The belt 20 carries in close relation a multiplicity of holders 28 for receiving the individual tomatoes which are in practice manually impaled thereon. The upper working run of the belt carries the fruit holders 28 through a longitudinal slot 29 in the table 30 of the machine. The holders project above the table through the slot 29. In the illustrated example, the front of the table is shown at the left of Figs. 1 and 2 and the tomatoes A are impaled by the attendant on the holders adjacent to the said front end, with the calix or front of the tomato uppermost. In the preferred mode of practising my invention, the belt 20 carries the impaled tomatoes successively through or past the following devices, to wit: A washer B within a hood B'; a slitting device C for slitting the tomatoes on longitudinal lines, that is to say, on lines running lengthwise with the core of the tomato; past a scoring or cutting device D which cuts or scores the skin on an annular line marking the bottom portion to be subsequently trimmed off by the coring device; past a topping device E for cutting off the skin at the top and a minimum amount of the fruit; past the scalding device F and cooling device G, both within a hood H; through a peeling mechanism I; and deposited on the table after detaching themselves from the holders 28, the fruit being then carried along the surface of the table to and past a corer J. On the shanks of the fruit holders 28 at opposite sides, are rollers 31 adapted to travel on track rails 32 beneath the table 30 at opposite sides of the slot 29.

Figure 3:
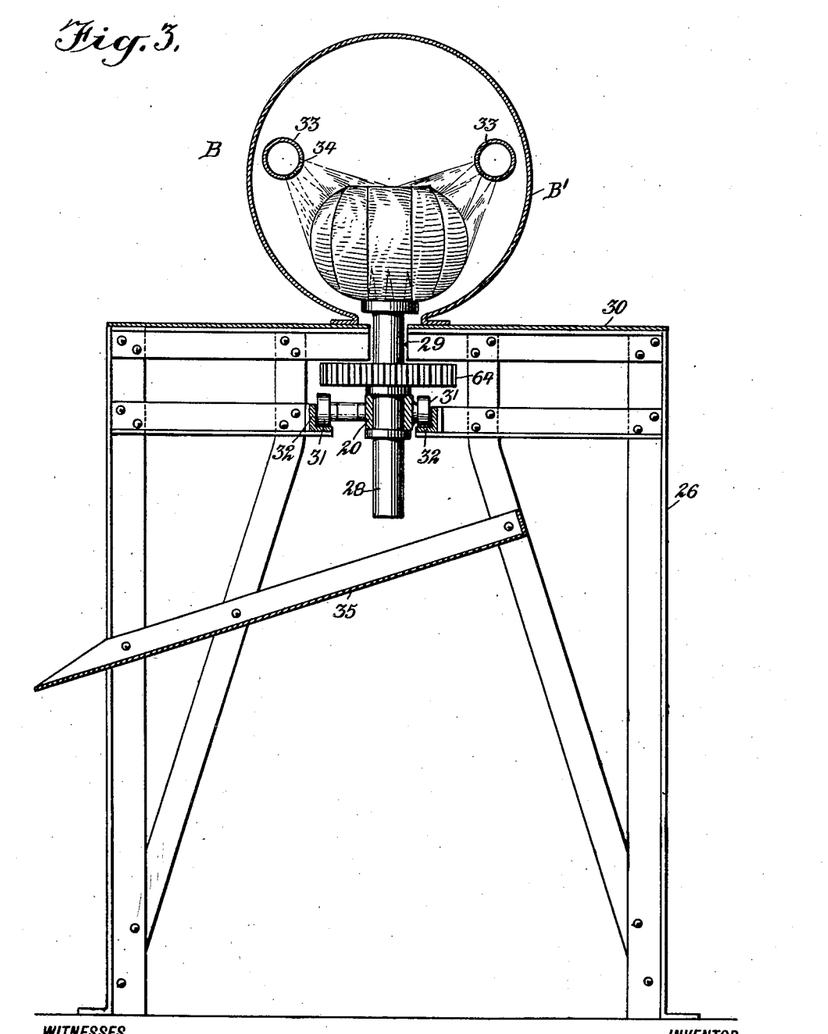
Fig. 3 is an enlarged transverse vertical section on the line 3—3, Fig. 1.

The washer B, as indicated in Figs. 1 and 3, is shown as comprising spray pipes 33 connected in practice with any suitable water supply not shown, the pipes being disposed slightly above and at opposite sides of the path of travel of the tomatoes A and formed with spray jets 34. Below the washer an inclined pan or chute 35 receives and conducts off the water falling from the washed tomatoes.

The slitting device C as best shown in Figs. 4 to 9 comprises an elongated head 36 sustained on vertical shafts 37, 38, said shafts carrying horizontal sprocket wheels 39, one of the shafts being driven in a manner hereinafter described. Traveling about the sprocket wheels 39 is an endless belt 40, the opposite runs of which travel over opposite faces of the head 36. The chain belt 40 carries a series of slitting devices 41 comprising sleeves 42 secured to the belt 40 in any suitable manner as by clamps 43. Vertically slidable in each sleeve 42 is a spindle 44 on the lower end of which is a head 45 secured to which are a series of resilient fingers 47 curving vertically and carrying at their lower ends concave rollers 48, the axles 49 of which are mounted in the forked ends 50 on the resilient fingers 47 and adjacent to the opposite ends of each roller 48 there is secured on the forks suitable cutters 51. Additional spring arms 52 are secured to the fingers 47 at the back of each finger and carry pilot rollers 53 at their lower ends. There are four of the spring fingers 47 and their appurtenances in the illustrated example and with their complement of cutters they produce the necessary number of longitudinal slits $a$ in the skin of the fruit A. The fingers 47 are shown as held at their upper ends within a clamp band 54 and they may be secured by screws or other suitable fasteners as at 55 to the head 45. At the lower end of the head 45 is a compression spring 56 carrying a presser plate or bar 57 at its lower end adapted to bear against the top of the tomato. On each spindle 44 is secured a roller 58ª turning on the shank of a screw or the like 59 which extends through a vertical slot 60 in the spindle 44. The respective rollers 58ª travel in a cam groove 61, Figs. 1 and 4, extending about the head 36 at the exterior. The belt 40 travels at the same speed as the belt 20 and the positions of the slitting devices 41 on said belt relatively to one another and relatively to the holders 28 on the belt 20 are such that as the holders with the fruit thereon are carried past the slitting device, the spindles 44 will register vertically with the tomatoes A, so that when the roller 58 of a spindle reaches the depression of the cam groove, the spindle will be forced downwardly toward the fruit A and the rollers 48 carried by the fingers 47 will be grouped about the top of the tomato so that with the descent of the spindle 44 the knives 51 will produce slits $a$ in the skin of the tomato running generally longitudinally with the core of the tomato. The spring arms 52 and their rollers 53 are for the purpose of overcoming any tendency of the spring fingers 47 to be flexed radially inward when the rollers 48 contact with the tomato, and particularly in the case of a tomato having a pronouncedly flat top, the rollers 53 will function by contacting with the tomato laterally outward from the rollers 48 and at the curved side surface of the tomato, thereby resisting a tendency of the fingers 47 to flex radially inward and causing them to move outwardly and downwardly over the surface of the tomato. As the spindle 44 rises by the action of the cam slot on the roller 58 following a downward slitting movement, the presser plate 57 will prevent the tomato from being detached from the holder 28 by the upward movement of the spring fingers. In addition to the inherent resiliency of the fingers 47, a reinforcing spring 58 may be employed with each finger bearing against the same at the back.

Figure 4:
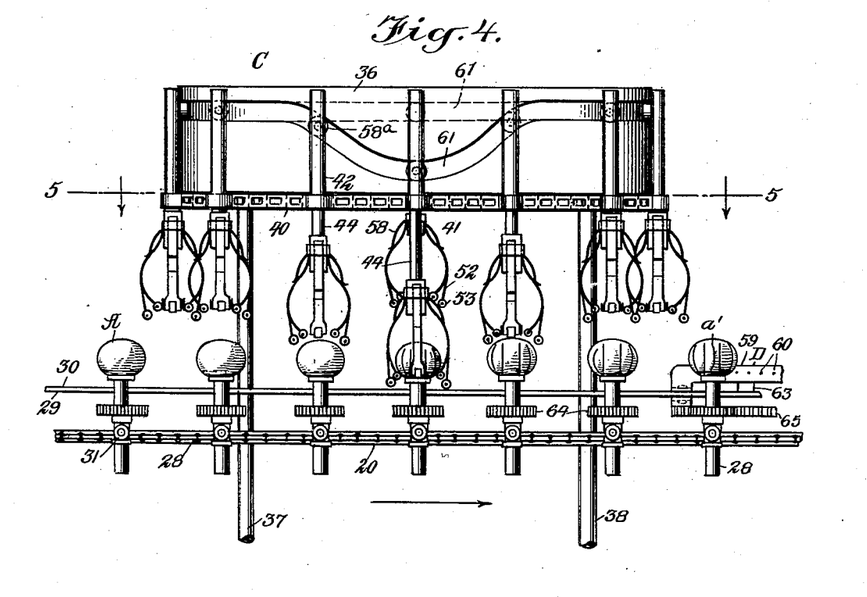
Fig. 4 is a fragmentary side elevation showing the means for slitting the skin on lines longitudinal with the core.
Figure 5:
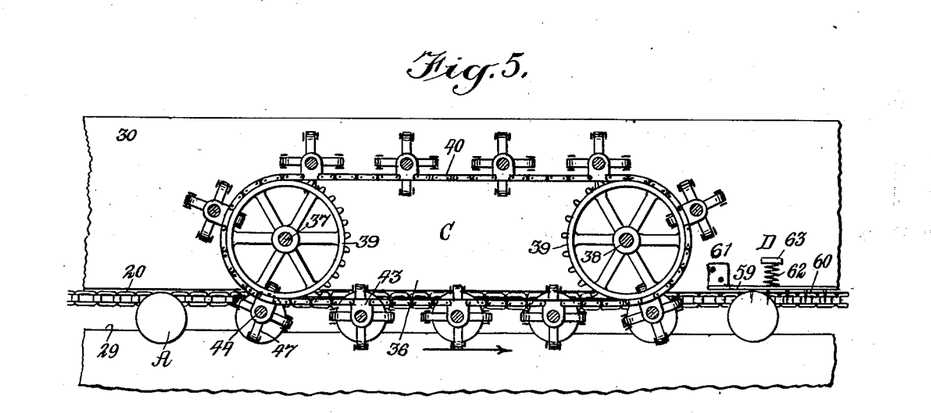
Fig. 5 is a horizontal section on the line 5—5, Fig. 4.
Figures 6, 7, 8, 9:
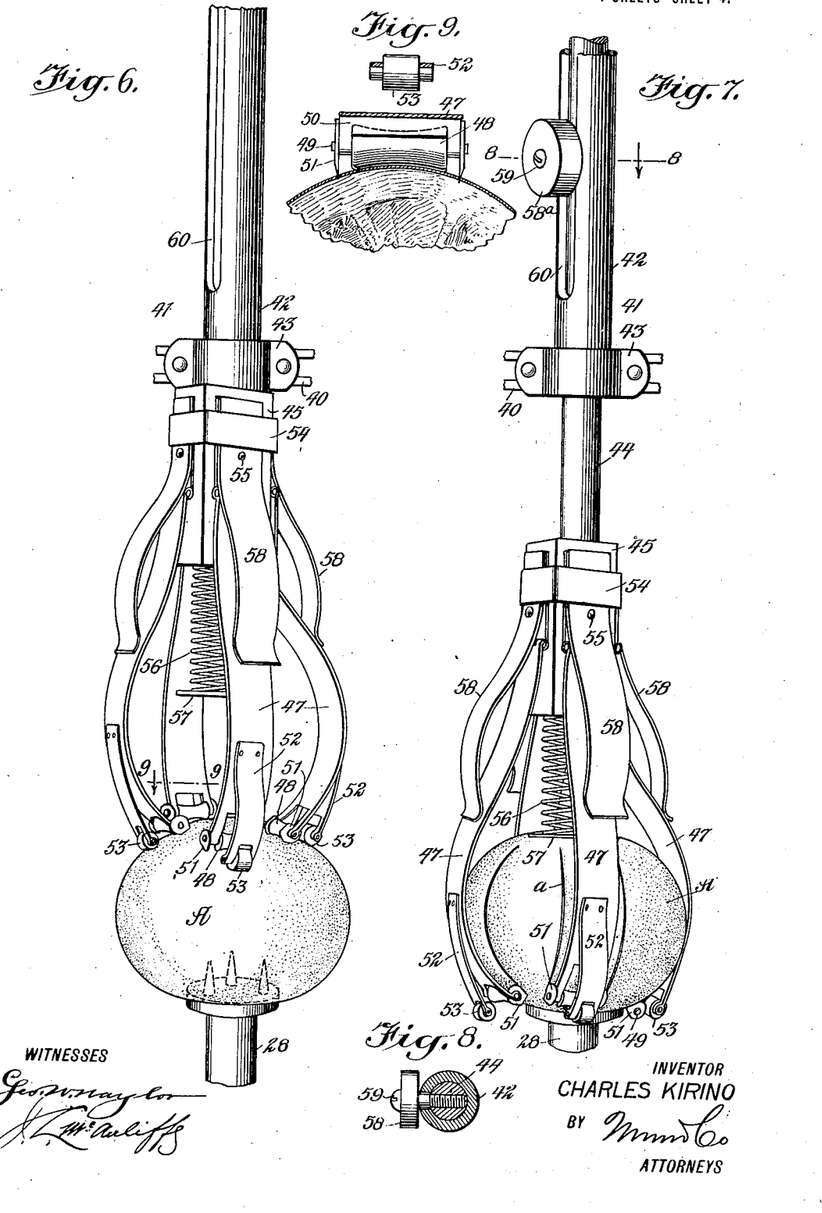
Fig. 6 is a perspective view on a still larger scale of one of the devices shown in Figs. 4 and 5 for slitting the skin longitudinally, showing said device ready to start the slitting operation.
Fig. 7 is a view similar to Fig. 6 but showing the device after slitting the tomato and before returning to the initial position.
Fig. 8 is a detail in cross section on the line 8—8, Fig. 7.
Fig. 9 is a detail in cross section on the line 9—9, Fig. 6.
Figure 13:
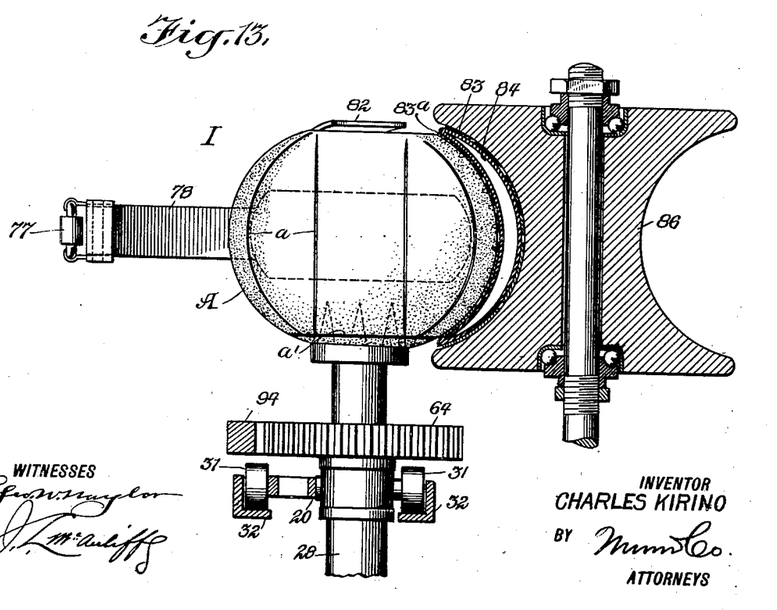
Fig. 13 is a cross section on the line 13—13, Fig. 12.
Figure 14:
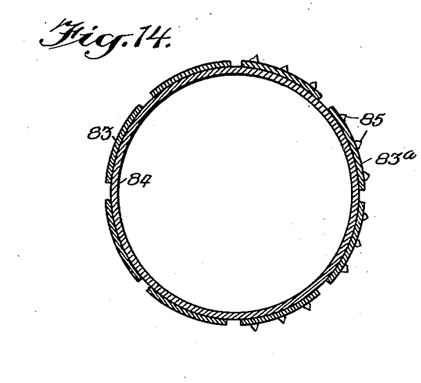
Fig. 14 is a cross section of the tubular peeling belt.
Figure 15:
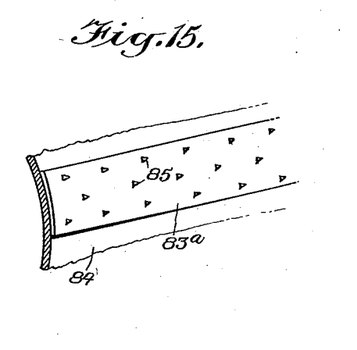
Fig. 15 is a fragmentary perspective view of a portion of the peeling belt.

After the slitting of the fruit, the latter is carried past the device D for cutting the skin circularly adjacent to the bottom of the tomato. In the illustrated form the device D includes a bar 59 disposed at one side of the slot 29 parallel with the latter. Said bar (see Figs. 4 and 5) is provided with teeth or spurs 60 projecting from the inner face thereof transverse to the path of movement of the fruit. The bar 59 is of thin resilient material suitably supported at its ends as by flanges or feet 61 thereon secured to the table. In addition to its inherent resiliency, the bar may be reinforced by a compression spring 62, pressing at one end against the back of said bar and at the opposite end against any fixed element 63. In passing over the face of the bar 59 the fruit is caused to turn by a turning of the holder 28 about its own axis for which purpose each holder has a pinion 64 with fine teeth thereon which meshes with a rack 65 beneath the table 30 and adjacent to the bar 59. The result is that the fruit is scored or cut annularly as at $a'$ as indicated in Figs. 4 and 13.

Figure 10:
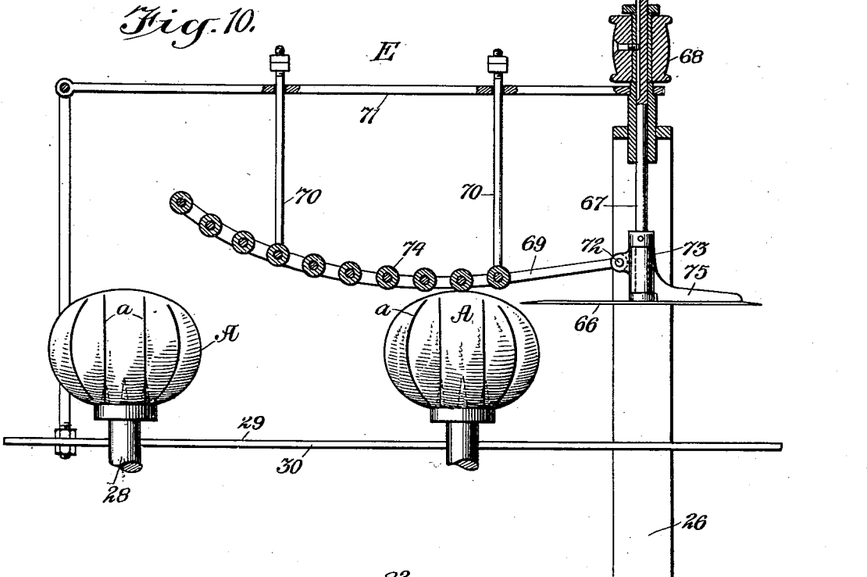
Fig. 10 is a longitudinal vertical section of the topping device.

After being operated upon by the device D, the fruit is subjected to the action of the topper E (Fig. 10) which includes a rotating cutter 66 secured to a vertical shaft or arbor 67 mounted in the framework 26 and driven by any suitable means, there being shown a pulley 68 on said shaft which is driven as hereinafter explained. The cutter 66 is adapted to remove the top of the tomato with a minimum of meat. Associated with the cutter 66 and in advance of the same is a yielding presser guide 69 suspended by hangers 70 or the like on the top bar 71 and hinged at one end as at 72 to any fixed support as for example to the fixed bearing 73 in which the lower end of the shaft 67 turns. Between the side bars of the presser guide 69 transverse rollers 74 are provided to effect a rolling contact with the fruit passing therebeneath. The presser guide as a whole presents a convex under side to accommodate itself to fruit of different sizes. At the upper side of the cutter 66 is a fixed lateral arm 75 to deflect the cut top from the cutter toward a side of the machine, the cut tops being disposed of in any suitable manner.

The fruit is now subjected to the scalding device F and then directly to the action of the cooler G. The devices F and G correspond with the washing device B, Fig. 3, there being hot water jet pipes and cold water jet pipes disposed similarly to the pipes 33 with respect to the path of travel of the fruit. A pan or chute 76 receives the water from the scalding and cooling devices F, G and directs the water to a side of the machine to be disposed of in any suitable manner.

Figure 12:
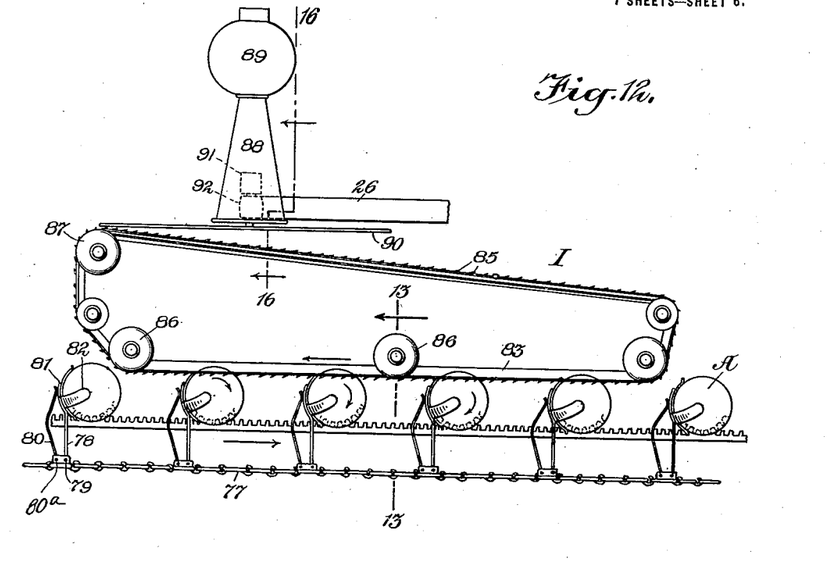
Fig. 12 is a plan view of the skin removing device or peeler proper.
Figure 16:
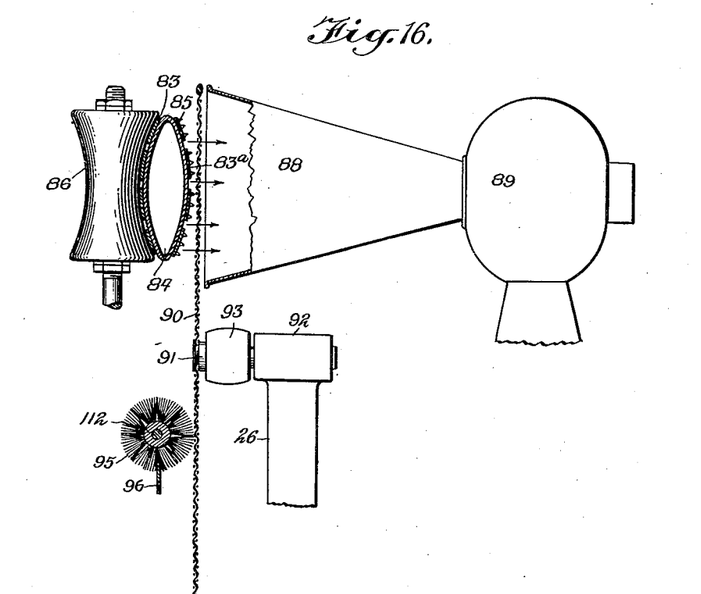
Fig. 16 is a cross section on the line 16—16, Fig. 12.

I will now describe the peeling device proper or device for removing the skins from the fruit after it has passed the cooler G. Said device, illustrated in detail in Figs. 12 to 16, includes an endless chain 77 having lateral yielding arms 78 thereon, preferably hinged to the chain as at 79 and pressed against by a spring 80 secured as at 80ᵃ to the chain. The outer end of each arm 79 carries a cup-like holder 81 presenting curved arms 82 to engage the fruit at the rear side thereof as it is carried along by the holders 28. A peeling belt 83 operates in connection with the belt 77 and travels in an opposite direction. The belt 83 consists of longitudinal resilient strips disposed about a pneumatic tube 84 and those trips 83ᵃ on the outer face of the belt and tube are provided with teeth or spurs 85. The belt 83 runs about pulleys 86, 87 certain of which, particularly those for guiding the working run of the belt adjacent to the belt 77, are concave. Thus, as the belt 83 travels opposite to the travel of the fruit A and the holding cups 81, the teeth 85 strip the skin sections from the fruit. In order to remove the skins from the peeling belt 83, I provide preferably a suction device which may consist of a flared tube or suction head 88 extending laterally from a fan casing conventionally shown at 89, the front end of said suction head lying adjacent to the path of the return run of the belt as best seen in Figs. 12 and 16. Interposed between the suction head 88 and the belt 83 is a revolving screen disk 90 mounted to turn in any suitable manner as by securing the same to a spindle 91 turning in a bearing 92 on a member of the frame 26 or equivalent support, said spindle having a suitable drive means, as for example, a pulley 93, to be driven as hereinafter explained. The fruit while subjected to the action of the peeler belt 83 is caused to turn by a turning of the holders 28 about their own axes for which purpose the pinions 64 are adapted to mesh with a fixed rack 94, Fig. 13, in line with the rack 65 and the path of travel of said pinions 64. The skins drawn from the spurs 85 onto the screen 90 are brushed from the latter by a revolving brush 95 turning in a hanger bracket 96 or the like at the under side of the table 30.

Figure 11:
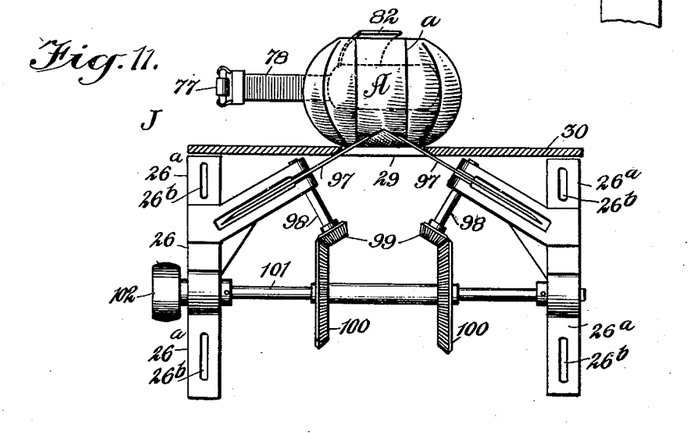
Fig. 11 is an end view of the device for cutting off the bottom of the tomato in removing the bottom end of the core and hereafter referred to as the coring device, the table in said view being shown in transverse vertical section.

The traveling holders 28 after having carried the fruit through the peeling mechanism, I, detach themselves from the fruit, leaving the latter deposited on the table 30. It will be observed from Fig. 2 that the belt 77 with the cup 81 extends along the table beyond the belt 83 and past the corer J so that the fruit freed from the holders is positively carried past said corer. One practical form of corer is shown in detail in Fig. 11 and consists of revolving cutters 97 which are angularly disposed and extend at their adjacent edges through the slot 29 of the table above the latter to cut a V-shaped core part from the meat of the tomato together with the skin below the annular scoring or cut mark produced by the device D. The cutters 97 are shown mounted on spindles 98 having bevel pinions 99 meshing with gear wheels 100 on a transverse shaft 101 turning in brackets 26ᵃ secured to the frame 26 beneath the table 30 and having a drive means such as a pulley 102. In order to make provision for causing the cutters 97 to cut any desired depth, any suitable adjusting means may be provided. Merely as an example of such means, I have indicated slots 26ᵇ in the brackets receiving bolts 26ᶜ, (Fig. 1) to vertically adjust the complete coring means.

The illustrated drive means is a follows: A belt 103 runs over the pulley 102 of the corer J and over a pulley 104 on a drive shaft 24 for driving the corer. A second belt 105 runs over a second pulley on shaft 24 and over a pulley 106 on a counter-shaft 106ª rigid with which pulley 106 is a bevel pinion 107 meshing with a bevel pinion 108 on a longitudinal shaft 109. A belt 110 runs over a pulley on the shaft 109 at 111 and over a pulley on the shaft 112 of the screen brush 95 for turning said brush. On the shaft 109 also is a bevel pinion 113 meshing with a similar pinion 114 on a vertical shaft 115 on which the drive pulley 87 of the peeler belt 83 is secured. On the shaft 115 also is a pinion 117 over which a transverse belt 116 travels, said belt traveling also over a pulley or sprocket 119 on a vertical counter-shaft 118 about which the belt 77 runs, said belt running also at its opposite end over a second sprocket 119ª. To turn the topping cutter 66 a bevel pinion 120 on the shaft 109 meshes with a similar pinion 121 on a vertical shaft 122 on which is a pulley 123 over which a belt 124 runs and to the pulley 68 on the spindle 67 of cutter 66. To drive the shaft 38 for driving the belt 40 of the slitting device C, a pinion 125 on the shaft 109 meshes with a similar pinion 126 on a vertical shaft 127 and a belt 128 runs over pulleys on said shafts 127 and 38 to drive the former. The shaft 37 turns freely in a step bearing 129.

In the operation of the machine the various steps are automatic following the impaling of the tomatoes A on the holders 28 at the feed end of the machine, that is to say, at the left of Fig. 1, the fruit then passing through the washer B to be slitted at C by the vertical movement of the spindle 44 and spring fingers 47 carrying the cutters 51 which slit the skin on approximately meridian lines. The fruit travels past the bar 59 and simultaneously is caused to turn about its axis by the turning of the holders 28 due to the engagement of the pinion 64 thereon with the fixed rack 65 and whereby the skin is ruptured, on an annular line a' adjacent to the bottom. The fruit then passes beneath the curved presser guide 69 and to the revolving topping cutter 66, after which the fruit is carried past the scalding jets issuing from F and then immediately past the cooling jets issuing from G. Next, the fruit is subjected to the action of the peeler belt 83 which travels at its working run in the opposite direction to the path of travel of the fruit, the cups 81 serving to yieldingly press the fruit against the reverse rubbing action of the teeth 85 on said belt 83. The holders 28 detach themselves from the fruit when said holders turn about the sprocket 22 and the freed fruit is carried by the still advancing cups 81 along the table 30 to and past the coring cutters 97 which cut and core the fruit on the annular line a' previously produced by the teeth of the bar 59.

Important advantages of my improved method reside in the slitting of the tomatoes skin-deep, to divide the skin into sections preparatory to the scalding so that the skin in its unimpaired strength offers the necessary resistance to the knives, while the dividing of the skin into sections makes it feasible to remove the scalded sections between the slits with facility and without wasting or damaging the meat of the tomatoes. The rupturing of the skin on an annular line at the bottom, as well as the topping of the tomato on a line adjacent to the upper ends of the slits completely, or substantially completely, separates the sections to insure the ready removal of the skin areas between the slits.

The employment of the inflated tubular belt in connection with the peeler permits of the belt accommodating itself approximately to the shape of the tomato to effect a close contact therewith in passing the fruit through the peeler without bruising the fruit.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a method of peeling fruits or vegetables as characterized, the steps of slitting the unscalded vegetable or fruit skin-deep, on lines running from points near the top to points near the bottom, removing the top on a line approximately adjacent to the upper terminals of the slits, rupturing the skin on a transverse line adjacent to the lower ends of the slits, scalding the article thus slitted and then removing the skin in sections between the slits.

2. In a method of peeling fruits or vegetables as characterized, the steps of slitting the unscalded fruit or vegetable skin-deep, on lines running from points near the top to points near the bottom, removing the top on a line approximately adjacent to the upper terminals of the slits, rupturing the skin on a transverse line adjacent to the lower ends of the slits, scalding the fruit or vegetable, then removing the sections of the skin between the slits, and finally cutting off the portions of said fruit or vegetable below the said sections.

3. In an apparatus for peeling tomatoes, employing a traveling conveyer for the tomatoes, means to produce cuts skin-deep, in the tomatoes, said means including a series of traveling cutters, and means to give movement to the cutters transverse to the direction of travel of the tomatoes.

4. In a machine for peeling tomatoes, a conveyer, holders thereon adapted to receive individual tomatoes, an endless series of cutters adapted to travel with the conveyer and corresponding in their relative positions with the relative positions of the holders, and means to move the cutters axially while traveling to thereby produce cuts in the skins of the tomatoes to divide the skins into separate areas.

5. In an apparatus for peeling tomatoes, a conveyer for the tomatoes, holders on the conveyer for receiving individual tomatoes, and means to produce cuts in the skins of the tomatoes, said cutting means including a group of members adapted to be laterally expanded in moving over the surface of a tomato, cutters carried by said arms, and means to impart reciprocating movement to said members while engaging the tomato.

6. In an apparatus for peeling tomatoes, a conveyer for the tomatoes, holders on the conveyer for receiving individual tomatoes, and means to produce cuts in the skins of the tomatoes, said cutting means including a head adapted to be reciprocated vertically, resilient members carried by said head in group form to be disposed about a tomato, cutters on said members to produce cuts skin-deep, in the tomato as the head is reciprocated, and a yielding presser provided within said group of elements, adapted to bear against the top of the tomato and to permit of a continued movement of the said elements and their cutters relatively to said presser device.

7. In an apparatus for peeling tomatoes, a conveyer for the tomatoes, holders on the conveyer for receiving individual tomatoes, and means to produce cuts in the skins of the tomatoes, said cutting means including a group of resilient elements adapted to be laterally expanded in moving over the surface of a tomato, cutters on said elements, and pilot devices on said elements outside of the cutters, to cause an outward movement of the said elements over the surface of the tomato.

8. In an apparatus for peeling tomatoes, a conveyer for the tomatoes, holders on the conveyer for individual tomatoes, and means to produce cuts skin-deep, in the tomatoes to divide the skin into areas, said cutting means including an endless belt having the working run adjacent to and traveling in the same direction with the conveyer, a series of spindles adapted to reciprocate axially relatively to the said belt, relatively fixed means to move said spindles axially as the spindles are carried along with the conveyer belt, and cutters on said spindles adapted to cut the tomato skin-deep by the axial movement of the spindles.

9. In a machine for peeling tomatoes, a conveyer for tomatoes, means on the path of movement of the conveyer to produce cuts skin-deep in the tomatoes, and means to rupture the skins of the tomatoes on a line extending about the latter adjacent to the lower ends of the cuts, said last-mentioned means including a relatively fixed device adjacent to the path of movement of the tomatoes.

10. In a machine for peeling tomatoes, a conveyer for tomatoes, means on the path of movement of the conveyer to produce cuts skin-deep in the tomatoes, and means to rupture the skins of the tomatoes on a line extending about the latter adjacent to the lower ends of the cuts, said last-mentioned means including a relatively fixed device adjacent to the path of movement of the tomatoes, said device being yieldable laterally of the path of movement of the tomatoes.

11. In a machine for peeling tomatoes, a conveyer for tomatoes, means on the path of movement of the conveyer to produce cuts skin-deep in the tomatoes, and means to rupture the skins of the tomatoes on a line extending about the latter adjacent to the lower ends of the cuts, said last-mentioned means including a relatively fixed device adjacent to the path of movement of the tomatoes; together with means to cause the tomatoes to turn about their axes on the conveyer while engaged by said relatively fixed device.

12. In a tomato peeling machine, a topping device comprising a cutter, a presser guide leading to the cutter, adapted to accommodate tomatoes of different sizes, and means to carry tomatoes beneath said presser guide and past said cutter.

13. In a tomato peeling machine, a topping device comprising a cutter, a presser guide leading to the cutter, adapted to accommodate tomatoes of different sizes, and means to carry tomatoes beneath said presser guide and past said cutter, said guide curving vertically and having a series of transverse rollers to engage the tomatoes.

14. In a tomato peeling machine, a peeling mechanism, and a conveyer to deliver scalded tomatoes to said mechanism, said mechanism including a pneumatic belt having the working run traveling adjacent to the path of travel of the conveyer and having a relative movement to exert a rubbing action on the tomatoes.

15. In a tomato peeling machine, a peeling mechanism, and means to give traveling movement to the tomatoes through said peeling mechanism, said mechanism including traveling holders for the individual tomatoes and yieldable to pressure opposing the direction of travel of said holders, and a peeling belt traveling adjacent to the path of movement of the tomatoes and in the opposite direction.

16. In a tomato peeling machine, an endless pneumatic belt having scraper elements thereon, and means to convey scalded tomatoes past said belt and in the opposite direction.

17. In a tomato peeling machine, an endless pneumatic belt having scraper elements thereon, and means to convey scalded tomatoes past said belt and in the opposite direction; together with concave pulleys over which the working face of said pneumatic belt travels.

18. In a machine of the class described, peeling means, and means to convey past said peeling means the article to be peeled, said peeling means including an endless pneumatic belt and resilient metal strips extending about said belt, and having scraper elements thereon to effect the peeling.

19. In a tomato peeling machine, an endless conveyer belt having holders thereon adapted to receive individual tomatoes, an endless series of yieldable elements mounted to travel with the said conveyer and adapted to engage the tomatoes on the holders, means to peel the tomatoes while engaged by said elements, a table through which the holders project, the holders being adapted to free themselves from the tomatoes to deposit the latter on the table, said series of yieldable elements having a travel beyond the conveyer to advance the tomatoes after being freed from the holders, and a coring device to which the freed tomatoes are delivered by said elements.

CHARLES KIRINO.